United States Patent Office 3,813,366
Patented May 28, 1974

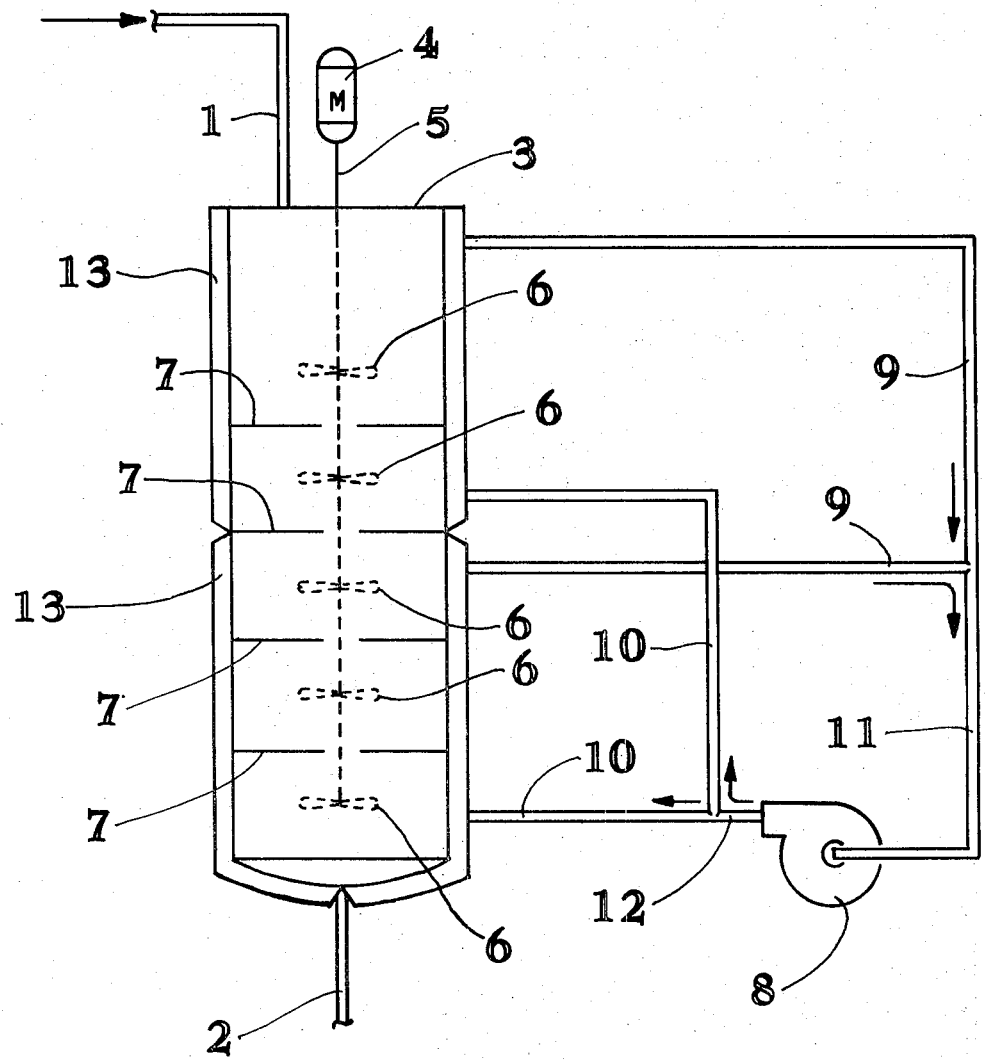

3,813,366
METHOD TO PREPARE NYLON 6 PREPOLYMER PROVIDING A FINAL SHAPED ARTICLE OF LOW OLIGOMER CONTENT
William Howell Wright, Petersburg, Alex John Bingham, Richmond, and William Albert Fox, Chester, Va., assignors to Allied Chemical Corporation, New York, N.Y.
Filed Mar. 21, 1973, Ser. No. 343,594
Int. Cl. C08g 20/14
U.S. Cl. 260—78 L    7 Claims

ABSTRACT OF THE DISCLOSURE

A coupled process for the production of polycaproamide shaped articles from molten anhydrous nascent polymer is disclosed. The improvement is hydrolyzing to form prepolymer by continuously maintaining a carefully controlled temperature profile, from top to bottom of the hydrolyzer, from a top temperature of 200° to 240° C. and a bottom temperature of 245° to 275° C. with no more than 25° difference between the stages and substantially uniform temperature within each stage by mixing with a high degree of turbulence within each stage to achieve a mixing Reynolds number of from about 250 to about 200,000, and achieving plug flow effect along the length of the reactor by baffles between each stage, so the final product has a water extractables content of less than 3.5 percent and oligomer content of less than 2.5 percent.

BACKGROUND OF THE INVENTION

This invention relates to the production of polyamides. More particularly, it relates to the production of nylon 6 shaped articles from a continuous process where the shaped articles such as filaments are produced directly from the freshly prepared or nascent polymer of epsilon-caprolactam which has not been isolated in solidified form. Even more particularly, the invention relates to the improvement of using a vertical multisage hydrolyzer reactor with baffles between each stage to achieve plug flow effect, maintaining a carefully controlled temperature profile from top to bottom of the reactor by mixing with a high degree of turbulence to form a prepolymer that will give a final shaped polymer product with a water extractables content of less than 3.5 and oligomer content less than 2.5 percent. The hydrolyzer shown in the drawing of this invention is designed for use in a coupled polymerization-spinning process such as described in U.S. 3,578,640 to Twilley et al. (May 11, 1971), said patent hereby incorporated by reference in toto. All pertinent portions of the following patents discussed as part of the prior art are also incorporated by reference. Another Twilley et al. patent U.S. 3,558,567 (Jan. 26, 1971) teaches production of low oligomer content nylon 6 by using less severe conditions until 45 percent of the monomer is reacted, then higher temperature and more severe conditions. Wiesner et al. U.S. 3,171,829 (Mar. 2, 1965) teaches that stiring during the polymerization of polycaproamide should create practically no turbulence and the reaction mass should progress through each reaction zone by plug flow without substantial back mixing. U.S. Pat. 3,090,773 (May 21, 1963) to Papero et al. teaches a batch uncoupled process with various degrees of agitation in each batch. U.S. Pat. 2,562,796 to Koch shows a reactor with a jacketed polymerization vessel for preparing linear polyamides. Saunders et al., U.S. 3,686,826 and Kilpatrick, U.S. 3,526,484 show finishers which provide a surface renewal device to promote completion of the polymerization reaction by polycondensation. British Pat. 1,097,347 teaches that baffles may be used in a stirred reactor but requires nearly equal residence times in both of the reaction vessels shown. None of the prior art references nor any of them combined teach the temperature profile of this invention achieved by agitation in each stage in a multi-stage hydrolyzer having baffles to give the effect of plug flow.

SUMMARY OF THE INVENTION

This invention is an improved process for the production of polycaproamide shaped articles from molten anhydrous nascent polymer. Prior art processes continuously polymerized epsilon caprolactam in a hydrolyzer reactor to form a prepolymer, preferably at an elevated temperature and pressure in the presence of small amounts of water and a terminating agent, then continuously removed most of the water extractables, preferably by exposure to vacuum in a vessel providing the prepolymer melt with a large surface area-to-volume ratio and a residence time in the vessel of about 10 minutes, then completed the polymerization reaction by polycondensation, preferably in a surface renewal device also having a large surface area-to-volume ratio to promote the completion of the polymerization reaction by polycondensation and to remove a residual amount of vaporizable materials, preferably at a temperature between about 225° C. and about 300° C. and preferably with a residence time of more than one hour, then continuously extruded the polymer melt and finally cooled the extruded polymer to form uniformly shaped articles such as filaments. The improvement of this invention comprises carrying out the continuous polymerization in the hydrolyzer reactor by continuously feeding the epsilon caprolactam into a vertical multistage hydrolyzer reactor, continuously maintaining a carefully controlled temperature profile, from top to bottom of the reactor, of from between about 200 to about 240° C. temperature at top to a bottom temperature of between about 245° to about 275° C. with no more than about 25° C. temperature difference between the stages, and with substantially uniform temperature within each stage by mixing with a high degree of turbulence within each stage to achieve a mixing Reynolds number of from about 250 to about 200,000 and removing the prepolymer so formed from the reactor and further processing to form a final shaped polymer product with a water extractables content of less than 3.5 percent and oligomer content of less than 2.5 percent. The prepolymer so prepared preferably has a viscosity of between about 50 to about 3,000 centipoise, more preferably between about 50 and 200 centipoise. A preferred method is using a hydrolyzer reactor having 2 to 10 stages, temperature at the top of the reactor between 210 and 235° C. and temperature at the bottom of the reactor between 250 and 270° C., having a temperature difference between the first two stages of no more than about 25° C. and between successive stages no more than about 10° C. and having the viscosity of the prepolymer between about 50 and about 200 centipoise. In a more preferred method, the reactor has 3 to 7 stages. The method of this invention also includes stages heated or cooled with a heat exchange medium circulating in an outer jacket on the hydrolyzer reactor.

For means of defining this invention, the word "nascent" shall mean freshly prepared polymer of epsilon caprolactam which has not been isolated in solidified form. Also, to define this invention, "plug flow effect" shall mean that effect achieved by flow from stage to stage with a very minimum of back mixing, that is, very little of the polymer in a certain stage is mixed back into the previous stage.

BRIEF DESCRIPTION OF THE DRAWING

The drawing shows a schematic presentation of the hydrolyzer reactor used for the method of this invention.

DESCRIPTION OF THE PREFERRED EMBODIMENT

Apparatus to carry out the process of this invention is shown in the Figure of U.S. 3,578,640 with the exception that the melt lactam tank 12, reactor 30 and/or polyaddition reactor 40 would be replaced by the hydrolyzer reactor 3 shown in the drawing of this application. As shown in the drawing, hydrolyzer 3 has monomer entrance line 1 at top and prepolymer exit line 2 at bottom. Jackets 13 hold cooling medium circulated by pump 8 into header line 12 through supply lines 10 to jacket 13 and out through lines 9 to pump supply line 11. Cooling or heating jackets 13 can be used both to heat the polymer on start-up and to heat or carry away the exothermic heat of reaction during a continuous reaction. Inside hydrolyzer reactor 3 are agitators 6, preferably of a turbine type, on shaft 5 driven by motor 4. Also, on hydrolyzer 3 are baffles 7 to separate the five stages shown. The upper stages or stages may be used as surge capacity and therefore may not contain monomer and other reactants at various times. In the preferred operation, monomer was fed in through line 1 containing 45 milliequivalents (equivalents per million grams of monomer) acetic acid, 1.5 weight percent water, and 0.004 weight percent manganese hypophosphite. Only the last four stages of the hydrolyzer 3 were used. The temperature at the top stage was about 228° C., at the second stage was about 252° C., temperature at the third stage was about 258° C., and temperature at the bottom was about 260° C. Viscosity of the incoming reactants is about 1 centipoise and viscosity of the prepolymer exiting through line 2 is about 100 centipoise giving a Reynolds number of about 142,000 at the top stage and a Reynolds number of about 37,000 at the second stage, a Reynolds number of about 15,000 at the third stage, and a Reynolds number of about 8,000 at the bottom stage.

Although it is most difficult to measure temperature at various positions within each stage, indications are that a uniform temperature within each stage is obtained. Similarly, although it is most difficult to measure the lack of mixing between stages, all indications point to a plug flow effect between the stages. In any case, the effect of back mixing can be overcome by adding more stages. The final extruded filaments from the coupled process downstream of the hydrolyzer reactor of this invention provides a polymer of about 3.0 percent by weight of water extractables and about 2.0 percent by weight oligomer content. This invention provides a workable process for prepolymer production in only one vessel using highly turbulent conditions resulting in a uniform temperature profile from top to bottom of the hydrolyzer reactor and yet achieves a plug flow effect by means of baffles. This essential carefully controlled temperature profile in a continuous hydrolyzer reactor is used to produce a nylon 6 prepolymer with an oligomer content of less than 2.5 percent. It is an essential feature of this invention that a high degree of turbulence be used to promote heat transfer and that baffles be used to produce a stage effect in a single vessel with desired plug flow effect. The residence time in the process of this invention is typically about 3 hours in the hydrolyzer reactor. As shown in the following table, using a batch reactor to simulate continuous conditions, preparing the prepolymer without the temperature profile of this invention would require either a much longer time, nearly double, or a much higher temperature resulting in an undesirable high oligomer weight percent content. Only by using the temperature profile as in Run No. 3 in the batch reactor can the time be kept to an economical length and the weight percent of oligomer kept to a desirable figure. Undesirable high oligomer content would cause plugging of vapor lines in subsequent processing of the prepolymer to remove volatiles, or if not removed, would cause severe spinning problems (breaks, drips) when the polymer was spun in the coupled process of this invention.

TABLE

| | Conditions | | | |
|---|---|---|---|---|
| Run number | Reaction temperature, ° C. | Time, hrs. | Prepolymer, FAV** | Percent oligomer* |
| 1 | 245 | 6 | 12.55 | 1.7 |
| 2 | 275 | 2 | 10.55 | 2.9 |
| 3 | 245 to 265 | 3.5 | 10.7 | 2.0 |

*Average of two analyses.
**FAV means formic acid viscosity determined by ASTM D-789-62-T.
Oligomer content was determined by water extraction of a sample by measuring refractive index of wash water then determining the monomer content by gas chromatography. The difference between total extractables and monomer content was considered oligomers. A typical range of the revolutions per minute of the impeller would be between about 10 and 100 r.p.m. with an impeller diameter of between about one and ten feet.

We claim:

1. In a process for the production of polycaproamide shaped articles from molten anhydrous nascent polymer comprising (a) continuously polymerizing epsilon caprolactam at an elevated pressure and temperature in the presence of small amounts of water and a terminating agent in a hydrolyzer reactor to form a prepolymer melt, then (b) continuously removing most of the water and part of unreacted lactam from said prepolymer melt by exposure to vacuum in a vessel providing said prepolymer melt with large surface area-to-volume ratio, residence time in said vessel being about 10 minutes, then (c) continuously transferring said melt to a surface renewal device also having large surface area-to-volume ratio, which promotes completion of the polymerization reaction by polycondensation and which removes residual amounts of vaporizable materials, at a temperature between about 225° C. and about 300° C., and a residence time of more than 1 hour, then (d) continuously extruding said melt, and finally (e) cooling said extruded polymer to form uniformly shaped articles the improvement comprising carrying out step (a) by continuously feeding said epsilon caprolactam into a vertical multistage hydrolyzer reactor with baffles between each stage, said baffles achieving plug flow effect along the length of the reactor, continuously maintaining a carefully controlled temperature profile, from top to bottom of said reactor, of between about 200 to about 240° C. temperature at top to a bottom temperature of between about 245 to about 275° C. with no more than about 25° C. temperature difference between stages, and with substantially uniform temperature within each stage, said profile achieved by mixing with a high degree of turbulence within each stage to achieve a mixing Reynolds number of from about 250 to 200,000, and continuously removing the prepolymer so formed from said hydrolyzer reactor, said prepolymer having a viscosity of between about 50 to about 3,000 centipoise, to form a final shaped polymer product with a water extractables content of less than 3.5 percent and oligomer content less than 2.5 percent.

2. In a process for the production of polycaproamide shaped articles from molten anhydrous nascent polymer comprising continuously polymerizing epsilon caprolactam in a hydrolyzer reactor to form a prepolymer, then continuously removing most of the water extractables and completing the polymerization reaction by polycondensation, then continuously extruding said polymer melt and finally, cooling said extruded polymer to form uniformly shaped articles the improvement comprising carrying out the continuous polymerization in the hydrolyzer reactor by continuously feeding said epsilon caprolactam into a vertical multistage hydrolyzer reactor under pressure with baffles between each stage, said baffles achieving plug flow effect along the length of the reactor, continuously maintaining a carefully controlled temperature profile, from top to bottom of said reactor, of from between about 200 to about 240° C. temperature at top to bottom temperature of between about 245 to about 275° C. with no more than about 25° C. temperature difference between stages, and with substantially uniform temperature within each stage by mixing with a high degree of turbulence within each stage to achieve a mixing Reynolds number of from about 250 to about 200,000 and removing the prepolymer so formed from said reactor, to form a final shaped polymer product with a water extractables content of less than 3.5 percent and oligomer content less than 2.5 percent.

3. The method of claim 1 wherein the temperature at the top of said reactor is between about 210° to about 235° C. and the temperature at the bottom of said reactor is between about 250° and about 270° C., the temperature difference between stages is no more than about 25° C. between the first two stages, and no more than about 10° C. between successive stages, and the viscosity of the prepolymer is between about 50 and about 200 centipoise.

4. The method of claim 1 wherein said hydrolyzer reactor has 2 to 10 stages.

5. The method of claim 3 wherein said hydrolyzer reactor has 3 to 7 stages.

6. The method of claim 3 wherein said stages are cooled with cooling medium circulating in an outer jacket on the hydrolyzer reactor.

7. The method of claim 6 wherein part of said stages is also heated.

References Cited
UNITED STATES PATENTS

| | | | |
|---|---|---|---|
| 3,047,541 | 7/1962 | Ryffel et al. | 260—78 L |
| 3,752,623 | 8/1973 | Sinn et al. | 260—78 L X |

LUCILLE M. PHYNES, Primary Examiner

U.S. Cl. X.R.

264—176 F

PO-1050
(5/69)

UNITED STATES PATENT OFFICE
CERTIFICATE OF CORRECTION

Patent No. 3,813,366    Dated May 28, 1974

Inventor(s) WILLIAM HOWELL WRIGHT, ALEX JOHN BINGHAM, WILLIAM ALBERT FOX and JOHN CHRISTOPHER HAYLOCK It is certified that error appears in the above-identified patent and that said Letters Patent are hereby corrected as shown below:

Column 1, line 6, inventor has been deleted from the listing of inventors to the patent. Please insert at line 6 after "Chester, Va.," --John Christopher Haylock, Richmond, Virginia,--.

Column 1, line 41, "multisage" should be --multistage--.

Column 1, line 60, "stiring" should be --stirring--.

Signed and sealed this 12th day of November 1974.

(SEAL)
Attest:

McCOY M. GIBSON JR.
Attesting Officer

C. MARSHALL DANN
Commissioner of Patents